P. H. CHAPMAN & H. M. PINGEN.
LIGHTNING ARRESTER.
APPLICATION FILED FEB. 2, 1914.
1,104,961.
Patented July 28, 1914.
3 SHEETS—SHEET 1.
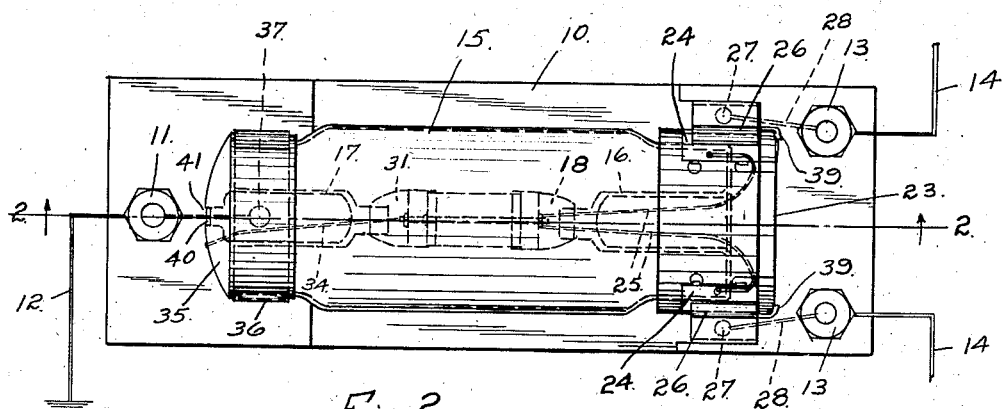
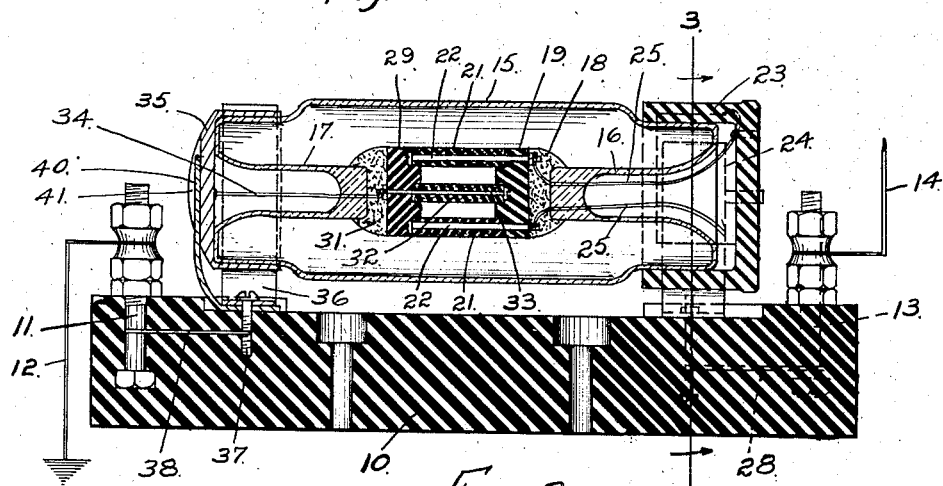
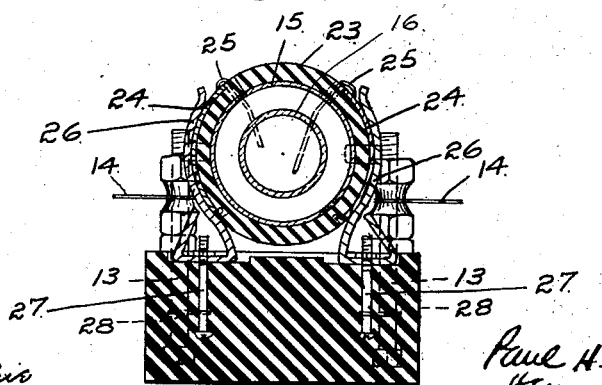
WITNESSES:
INVENTORS
BY
ATTORNEYS P. H. CHAPMAN & H. M. PINGEN.
LIGHTNING ARRESTER.
APPLICATION FILED FEB. 2, 1914.
1,104,961.
Patented July 28, 1914.
3 SHEETS—SHEET 2.
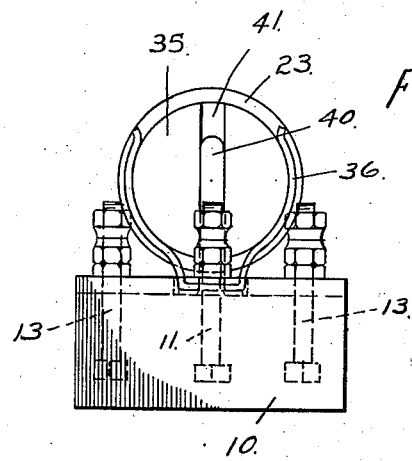
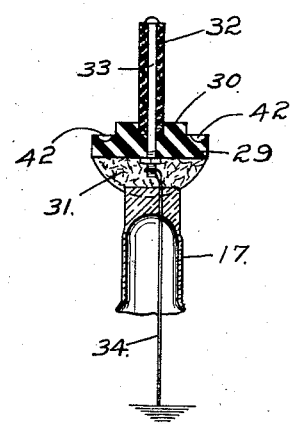
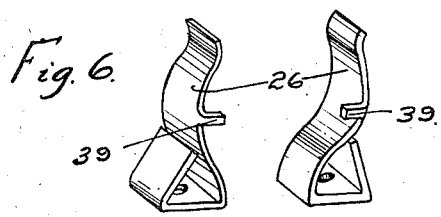
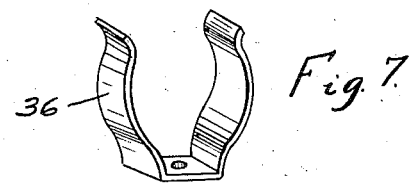
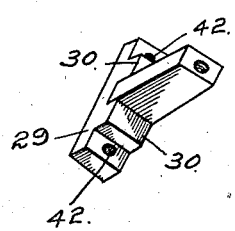
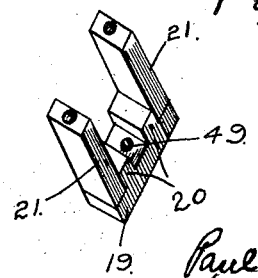
WITNESSES:
H. M. Gillespie
J. B. Lagorio
INVENTOR.
Paul H. Chapman
Henry M. Pingen
BY Barnes & Truman
ATTORNEYS P. H. CHAPMAN & H. M. PINGEN.
LIGHTNING ARRESTER.
APPLICATION FILED FEB. 2, 1914.
1,104,961.
Patented July 28, 1914.
3 SHEETS—SHEET 3.
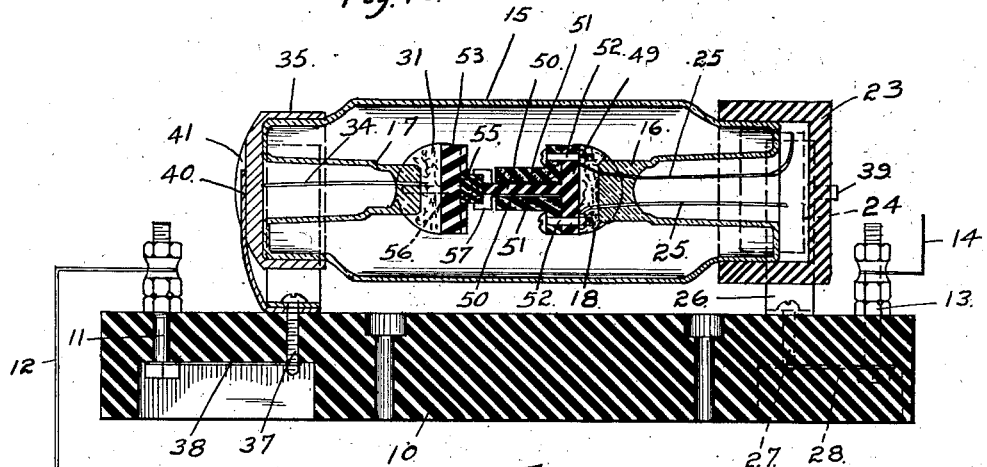
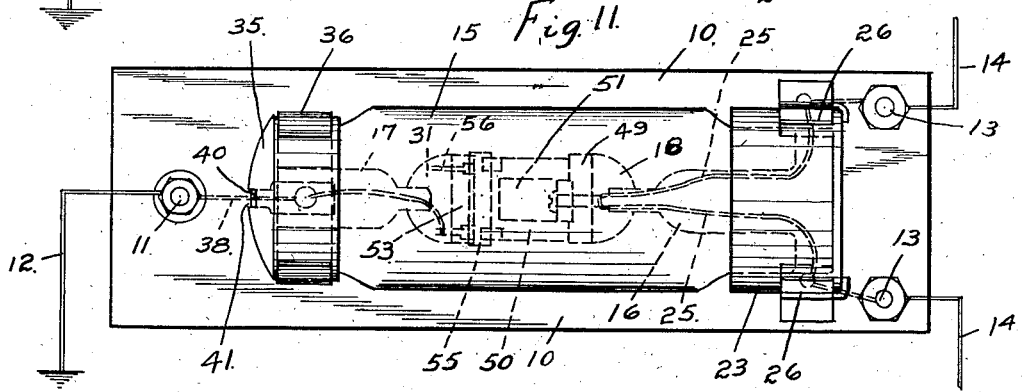
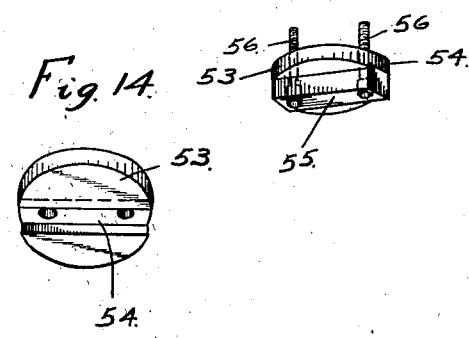
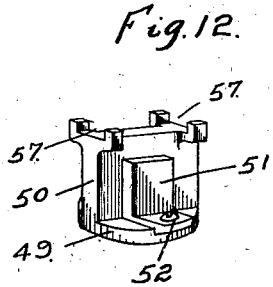
WITNESSES:
H. M. Gillespie
JB. Lagorio
INVENTOR.
Paul H Chapman
Henry M Pingen
BY
Barnes & Truman
ATTORNEYS

UNITED STATES PATENT OFFICE.

PAUL H. CHAPMAN AND HENRY M. PINGEN, OF TOLEDO, OHIO, ASSIGNORS TO THE NATIONAL ELECTRIC SPECIALTY COMPANY, OF TOLEDO, OHIO, A CORPORATION OF OHIO.

LIGHTNING-ARRESTER.

1,104,961.  Specification of Letters Patent.  Patented July 28, 1914.

Application filed February 2, 1914. Serial No. 816,070.

*To all whom it may concern:*

Be it known that we, PAUL H. CHAPMAN and HENRY M. PINGEN, citizens of the United States and of the Netherlands, respectively, residing at Toledo, in the county of Lucas and State of Ohio, have invented certain new and useful Improvements in Lightning-Arresters, of which the following is a specification.

Our invention relates to devices, commonly called lightning arresters, for protecting electrical apparatus from the destructive effects of high potential charges due to lightning, crosses with high power wires, and the like.

The principal object of the invention is to provide a lightning arrester of the vacuum type which will be compact, light in weight, and at the same time very strong so as to be capable of withstanding rough handling in shipment and the vibration and shocks to which devices of this character are often subjected when in use, for example, in railway signal work, and which, furthermore, will be simple in construction and economical to manufacture.

More particularly the invention is intended to provide in a vacuum lightning arrester of the cartridge type, that is, a device comprising an evacuated tube with the leading-in wires for the electrodes extending through the opposite ends of the tube, an arrangement of the electrodes and the supporting or mounting elements for the same which, besides facilitating the manufacture and assembling of the parts of the device, serves to reliably and firmly hold the electrodes spaced apart in proper position in the tube and in addition strengthen and rigidifies the entire structure. In a vacuum lightning arrester the electrodes and the bases or supporting elements on which they are mounted are relatively heavy in comparison with the rest of the structure. Therefore there is considerable danger that the devices will be broken or the electrodes displaced from their intended position either during shipment or after installation, in the latter case, particularly, when used in situations subjecting them to vibration.

The glass tube in an arrester of the cartridge type is ordinarily supported at opposite ends in spring clips or the like. Apparently the great heat developed by a discharge between the electrodes softens the glass at the middle of the tube to a certain extent. The stresses developed on the rarefied gas when a discharge takes place also appears to have a destructive effect upon the adjacent part of the tube. For these and possibly other reasons the glass tube in a device of this type has a tendency to sag or break in the middle.

Our invention provides an arrangement of the electrodes and their mountings which rigidifies and strengthens the tube as against this tendency. Furthermore, these arrangements are such as to facilitate the manufacture and assembling of the parts of the device.

The invention is shown, in certain preferred embodiments, in the accompanying drawings, wherein—

Figure 1 is a plan view of a lightning arrester embodying the invention in one form; Fig. 2, a longitudinal sectional view on line 2—2 of Fig. 1; Fig. 3, a cross sectional view on line 3—3 of Fig. 2; Fig. 4, an end elevation of the ground line end of the arrester; Fig. 5, a sectional view of the ground electrode, its base member and the stem on which it is mounted; Fig. 6, a view, in perspective, of the spring terminal clips which support one end of the arrester and provide for making the electrical connections between the line wires protected and the wires leading to the line wire electrodes in the evacuated tube; Fig. 7, a view, in perspective, of the device for supporting the other end of the tube; Figs. 8 and 9 are views, in perspective, of the ground electrode and the line wire electrodes mounted on their respective bases; Fig. 10 is a longitudinal sectional view of a modified construction; Fig. 11, a plan view of the same; Fig. 12, a view, in perspective, of the base member supporting the line wire electrodes; Fig. 13, a similar view of the base member for the ground electrode with said electrode secured thereto, and Fig. 14, a view of said base member with the electrode removed.

Like characters of reference designate like parts in the several figures of the drawings.

Referring first to Figs. 1 to 9 inclusive, 10 designates a base or block of porcelain or other suitable material having a binding post 11 for the ground wire 12 and binding posts 13 for the line wires 14.

15 designates an evacuated tube preferably made of glass, provided at opposite ends with inturned stems 16 and 17. Secured to the stem 16, preferably by a body of asbestos cement 18, is a porcelain base member 19 (Fig. 9) formed with a pair of lugs 20. Line wire electrodes 21 are secured to the base member 19 on opposite sides of the pair of lugs 20. We have shown, for this purpose, round headed bolts 22 which pass through the electrodes, which latter consist preferably of sticks of carbon. This end of the tube is furnished with a porcelain cap 23 to which are fixed contact plates 24, 24, electrically connected with the electrodes 21, 21 by leading-in wires 25, 25. The tube is supported, at this end, by a pair of spring members 26 secured to the base by bolts 27 which are connected by wires 28 to the binding posts 13.

A base member 29 (Figs. 5 and 8), formed with a pair of lugs 30, is secured by a body of asbestos cement 31 to the stem 17 at the other end of the tube. Mounted on the base 29, between the lugs 30, is a ground wire electrode 32 preferably secured to the base by the round headed bolt 33. A leading-in wire 34 extends from a metal cap 35, surrounding the end of the tube, to the end of bolt 33. This end of the tube is supported in a spring clip 36 (Fig. 7) secured to the block 10 by a screw 37 which is electrically connected to binding post 11 by a wire 38. Preferably the spring members 26 are formed with lugs 39 to prevent the longitudinal displacement of the arrester in this direction, in case the arrester is positioned vertically, and for a similar purpose the finger 40 is arranged at the end of the device preferably fitting into a groove 41 in the end of the cap 35.

If round headed bolts are used for securing the electrodes to their respective base members the opposite base member, in each case, is preferably formed with an indentation or indentations 42 to receive the head or heads of such bolt or bolts. This arrangement, and the fact that the outer ends of the electrodes bear against the projections on the base members opposite to the base members to which the electrode or electrodes, as the case may be, are secured, maintain the electrodes properly spaced apart and in proper position in the center of the block 10. The interlocked relationship between the electrodes and the base members also strengthens and rigidifies the entire device against any tendency to sag when the tube is heated, or to break because of vibration or other causes when in service, or because of rough handling in shipment. At the same time the parts of the device can be manufactured and assembled with very much less difficulty than would be the case if the bases and electrodes were structurally united. In manufacturing our device, each base member may be united with its stem, the electrode or electrodes secured to the base member, and the leading-in wire or wires sealed through the stem. The structures so formed may then be placed in opposite ends of the tube in the interlocked relationship described and the stems sealed to the tube.

In Figs. 10 to 14 inclusive, we have shown a modified form of our invention. The general construction of the tube, the means for supporting the same and the electrical connections between the electrodes and the line and grounded wires, are the same as in the device previously described. The only difference is in the construction and arrangement of the electrodes and the base members upon which they are mounted. The base member 49 on which the line wire electrodes are mounted is formed with a web 50, the electrodes 51 being secured, by bolts 52, to the base member on opposite sides of the web 50, which latter serves as a barrier to prevent sparking from one line electrode to the other. The other base member 53 is formed with a slot 54 in which is fitted the grounded electrode 55 which is secured to the base member by screws 56. The web 50 is formed with jaws 57 which engage the electrode 55 when the device is assembled.

We have described our invention as embodied in lightning arresters constructed so as to protect, in each case, two lines, the discharge taking place from either or both line wire electrodes to a single grounded electrode. Obviously the principle of the invention could be applied to the construction of a lightning arrester having a single line wire electrode, or to one having more than two line wire electrodes.

Other modifications might also be devised without departure from the principle of the invention. Therefore, we do not wish to be understood as limiting the invention to the precise constructions, arrangements and devices shown in the drawings.

We have used the term "bolt" to describe the device for securing the electrode to the bases, but intend thereby to include any suitable screw or equivalent attaching means. While preferring to use bolts as shown, the electrodes might be secured to the bases by other expedients.

We claim:

1. A vacuum lightning arrester comprising an evacuated tube, mounting elements arranged in the tube at opposite ends thereof, and electrodes disposed between said elements which, in each case, are secured to one mounting element with the opposite end engaged with the other element, for the purpose described.

2. A lightning arrester comprising an evacuated tube, mounting elements arranged in the tube at opposite ends thereof, electrodes disposed between said elements, and attaching bolts for said electrodes which, in each case, bind the electrode to one element and engage the other element, for the purpose described.

3. A lightning arrester comprising an evacuated tube, mounting elements arranged in the tube at opposite ends thereof, electrodes disposed between said elements, and attaching bolts for said electrodes which, in each case, bind the electrode to one element and provide a projection for engaging the other element.

4. A lightning arrester comprising an evacuated tube, mounting elements arranged in the tube at opposite ends thereof, electrodes disposed between said elements, and attaching bolts for said electrodes having heads which project from the ends of the electrodes, said elements being formed with recesses into which the heads of said bolts fit.

5. A lightning arrester comprising an evacuated tube, mounting elements arranged in said tube at opposite ends thereof, electrodes disposed between said elements which, in each case, are secured to one of said elements, said elements being formed with spacing projections, for the purpose described.

6. A lightning arrester comprising an evacuated tube, a base member transversely arranged in the tube at each end thereof, a pair of electrodes, bolts having projecting heads securing one of said electrodes to one base member and the other to the other base member, the base members being formed with recesses into which said heads are fitted.

7. A lightning arrester comprising an evacuated tube, a base member transversely arranged in the tube at each end thereof, a pair of electrodes, bolts having projecting heads securing one of said electrodes to one base member and the other to the other base member, the base members being formed with recesses into which said heads are fitted, and with spacing projections between the electrodes.

8. A lightning arrester comprising an evacuated tube formed with inturned stems at opposite ends, mounting elements secured to said stems, electrodes arranged between said mounting elements which, in each case, are secured to one of said mounting elements and engage with the other mounting element, for the purpose described.

9. A lightning arrester comprising an evacuated tube formed with inturned stems at opposite ends, mounting elements secured to said stems, and electrodes arranged between said mounting elements which, in each case, are secured to one of said mounting elements and engage with the other mounting element, said elements being formed with spacing projections which intervene between said electrodes.

10. A lightning arrester comprising an evacuated tube formed with inturned stems at opposite ends, mounting elements secured to said stems, electrodes arranged between said mounting elements, and bolts which, in each case, secure an electrode to one of said mounting elements and which are formed with projecting heads, the opposite mounting element, in each instance, being formed with a recess into which the head of the bolt fits.

11. A lightning arrester comprising an evacuated tube formed with inturned stems at opposite ends, mounting elements secured to said stems, electrodes arranged between said mounting elements, and bolts, which in each case, secure an electrode to one of said mounting elements and which are formed with projecting heads, the opposite mounting element, in each instance, being formed with a recess into which the head of a bolt fits, and being formed with spacing projections intervening between said electrodes.

12. A lightning arrester comprising an evacuated tube having inturned stems at opposite ends thereof, a base member mounted on one of said stems and formed with a web, a pair of line wire electrodes mounted on said base member on opposite sides of said web, a base member secured to the other of said stems, a grounded electrode mounted on said last named base member, and jaws on said web adapted to engage said grounded electrode.

13. A lightning arrester comprising an evacuated tube, base members mounted in opposite ends of said tube, a pair of line wire electrodes having leading-in wires sealed through one end of said tube which are mounted on one of said base members, and a ground electrode having a leading-in wire, which is sealed through the other end of the tube, mounted on the other base member.

14. A lightning arrester comprising an evacuated tube, base members mounted in opposite ends of said tube, a pair of line wire electrodes having leading-in wires sealed through one end of said tube which are mounted on one of said base members, and a ground electrode having a leading-in wire, which is sealed through the other end of the tube and mounted on the other base member; the two structures comprising, in each case, the base member and the electrode, or electrodes secured thereto, having an interlocking engagement with each other, for the purpose described.

15. A lightning arrester comprising an evacuated tube having inturned stems, base members mounted on said stems, a pair of line wire electrodes having leading-in wires sealed through one end of said tube which are mounted on one of said base members, a ground electrode having a leading-in wire which is sealed through the other end of the tube and mounted on the other base member; the two structures comprising, in each case, the base member and the electrode, or electrodes mounted thereon, having an interlocking engagement with each other, for the purpose described.

16. A lightning arrester comprising an evacuated tube, base members mounted in opposite ends of said tube and an electrode secured to each of said base members; the two structures comprising, in each case, the base member and the electrode secured thereto having an interlocking engagement with each other, for the purpose described.

17. A lightning arrester comprising an evacuated tube having inturned stems at opposite ends, base members mounted on said stems, and an electrode secured to each of said base members; the two structures comprising, in each case, the base member and the electrode secured thereto having an interlocking engagement with each other, for the purpose described.

18. A lightning arrester comprising a base, an evacuated tube, a ground electrode mounted in one end of said tube, a pair of line wire electrodes in the other end of said tube, contact plates arranged exteriorly of the tube at one end thereof, leading-in wires sealed through the tube, and connected with said line wire electrodes respectively, and with said contact plates, and a pair of spring members electrically connected with the lines which the arrester serves which support one end of said tube and are in contact with said contact plates.

19. A lightning arrester comprising a base, an evacuated tube, a ground electrode mounted in one end of said tube, a pair of line wire electrodes in the other end of said tube, contact plates arranged exteriorly of the tube at one end thereof, leading-in wires sealed through the tube and connected with said line wire electrodes respectively, and with said contact plates, a pair of spring members electrically connected with the lines which the arrester serves which support one end of said tube and are in contact with said contact plates, a spring clip to support the other end of said tube, a metal cap on this end of the tube, a leading-in wire electrically connecting said cap with the ground electrode, a ground connection from said clip, and a spring finger adapted to bear against the end of the cap.

PAUL H. CHAPMAN.
HENRY M. PINGEN.

Witnesses:
M. E. Dick,
Myer Gelurd.